(12) United States Patent
Böldicke et al.

(10) Patent No.: US 10,126,511 B2
(45) Date of Patent: Nov. 13, 2018

(54) FIBER COUPLING DEVICE

(71) Applicant: Corning Optical Communications LLC, Hickory, NC (US)

(72) Inventors: Sören Böldicke, Potsdam (DE); Martin Spreemann, Berlin (DE); Eric Stephan ten Have, Berlin (DE); Gary Richard Trott, San Mateo, CA (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/157,691

(22) Filed: May 18, 2016

(65) Prior Publication Data

US 2016/0341915 A1 Nov. 24, 2016

Related U.S. Application Data

(60) Provisional application No. 62/165,343, filed on May 22, 2015.

(51) Int. Cl.
*G02B 6/42* (2006.01)
*G02B 6/43* (2006.01)
*G02B 6/26* (2006.01)

(52) U.S. Cl.
CPC ............ *G02B 6/423* (2013.01); *G02B 6/262* (2013.01); *G02B 6/424* (2013.01); *G02B 6/4257* (2013.01); *G02B 6/43* (2013.01)

(58) Field of Classification Search
None
See application file for complete search history.

(56) References Cited

U.S. PATENT DOCUMENTS 6,363,201 B2 * 3/2002 Sherrer ............... G02B 6/3636
385/137
7,366,367 B2 * 4/2008 Kuhara ............... G02B 6/4202
385/14

(Continued)

FOREIGN PATENT DOCUMENTS

JP 2170107 A 6/1990
JP 2003148673 A 5/2003

(Continued)

OTHER PUBLICATIONS

Sh. Afyouni Akbari; Isfahan, Iran; A. Gholami; M. Malekane Rad; Z. Mazaheri, "An Optical Subassembly Model Based on Silicon Optical Bench for VCSEL to MMF and PIN Photodiode to MMF Coupling," Telecommunications (IST), 2012 Sixth International Symposium on, Nov. 6-8, 2012, pp. 514-519.

(Continued)

*Primary Examiner* — Tina Wong
(74) *Attorney, Agent, or Firm* — Michael E. Carroll, Jr.

(57) ABSTRACT

A fiber coupling device comprising a mounting substrate, at least one optoelectronic and/or photonic chip and at least one first fiber coupling element for coupling an optical fiber to the fiber coupling device is disclosed. The optoelectronic and/or photonic chip has a main surface and comprises an optoelectronic and/or photonic active element couplable to a fiber end-piece of a respective optical fiber. The fiber coupling device further comprises at least one second fiber coupling element which is designed to contact and/or engage with a fiber end-piece of an optical fiber and which is mounted to the main surface of the at least one optoelectronic and/or photonic chip in a position aligned relative to the active element.

24 Claims, 8 Drawing Sheets

(56) References Cited

U.S. PATENT DOCUMENTS

| | | | |
|---|---|---|---|
| 7,488,122 B2 * | 2/2009 | Hashimoto | G02B 6/4277 385/49 |
| 7,603,021 B2 * | 10/2009 | Watanabe | G02B 6/30 385/137 |
| 8,774,578 B2 | 7/2014 | Choo | |
| 2003/0012522 A1 | 1/2003 | Johnson | |
| 2003/0133689 A1 * | 7/2003 | Jeong | G02B 6/3636 385/137 |

FOREIGN PATENT DOCUMENTS

| | | |
|---|---|---|
| JP | 2004240164 A | 8/2004 |
| JP | 2005165165 A | 6/2005 |
| JP | 2010225824 A | 10/2010 |
| JP | 2011123493 A | 6/2011 |

OTHER PUBLICATIONS

Atsushi Suzuki; Yoshitsugu Wakazono; Daisuke Nagao; Takaaki Ishikawa; Tomoyuki Hino; Youichi Hashimoto; Hiroshi Masuda; Shuji Suzuki; Mitsuaki Tamura; Tei-ichi Suzuki; Katsuya Kikuchi; Hiroshi Nakagawa; Yoshikuni Okada; Masahiro Aoyagi; Takashi Mikawa, "Self-Alignment of Optical Devices With Fiber for Low-Cost Optical Interconnect Modules," IEEE Photonics Technology Letters (vol. 20, Issue: 3), Feb. 1, 2008, pp. 193-195.

Myun-Sik Kim; Kyoung-Woo Jo; Jong-Hyun Lee, "Self-aligned Microlens fabricated on the Sidewall of 45°-angled Optical Fiber for NSOM Illumination System," Optical MEMS, 2003 IEEE/LEOS International Conference on, Aug. 18-21, 2003, pp. 18-19.

A. Suzuki, Y. Wakazono, S. Suzuki, M. Tamura, H. Masuda, T. Ishikawa, Y. Hashimoto, T. Suzuki, K. Kikuchi, H. Nakagawa, M. Aoyagi and T. Mikawa, "High optical coupling efficiency using 45°-ended fibre for low-height and low-cost optical interconnect modules," Electronics Letters (vol. 44, Issue: 12), Jun. 5, 2008, pp. 724-725.

* cited by examiner

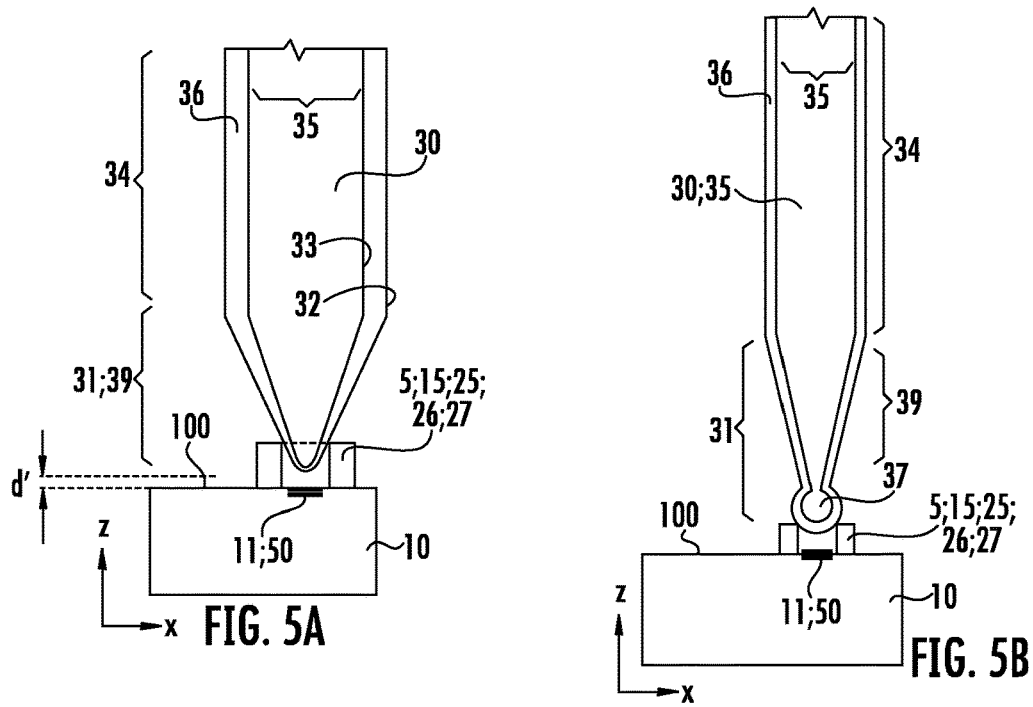
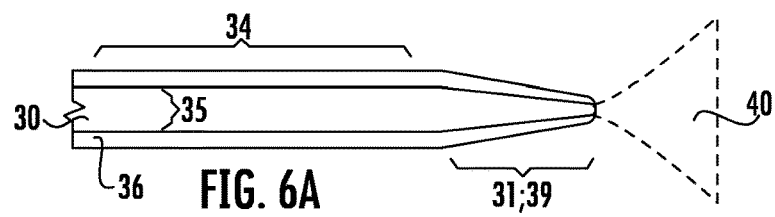
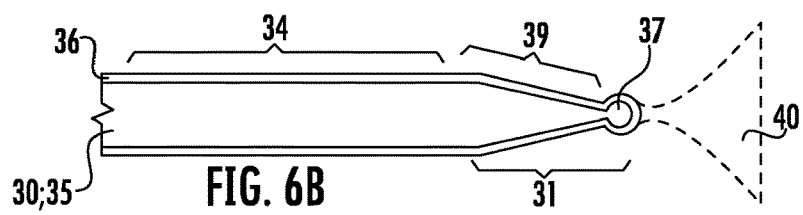
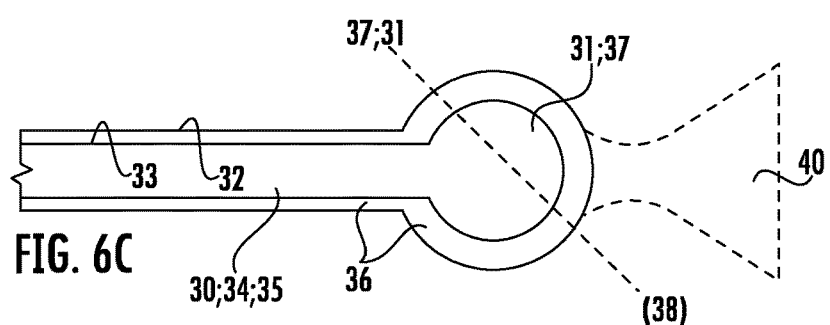

FIBER COUPLING DEVICE

CROSS-REFERENCE TO RELATED APPLICATIONS

This application claims the benefit of priority to U.S. Provisional Application No. 62/165,343, filed on May 22, 2015, and is incorporated herein by reference.

DESCRIPTION

The application refers to a fiber coupling device. Fiber coupling devices comprise a mounting substrate and at least one optoelectronic and/or photonic chip arranged on the mounting substrate. The chips comprise optoelectronic and/or photonic elements that is active elements for emitting and/or detecting electromagnetic radiation to or from optical fibers, i.e. fiber end-pieces. In the present application, the term fiber coupling device need not necessarily include any fiber or fiber end-piece. Rather, a fiber coupling device, wherever addressed in the application, shall denote a device or arrangement sufficiently prepared to allow mounting of at least one fiber and/or fiber end-piece.

Optical fibers are used for transmitting signals by means of electromagnetic radiation, such as visible light or infrared radiation, for instance. The end of the respective optical fiber has to be coupled, that is properly mounted in a precisely aligned relative position, to the active element of the optoelectronic or photonic chip. In case of optoelectronic rather than photonic chips, the active element may, for instance, be a light-detecting or light-emitting active element, such as a VCSEL, a laser diode, a photo diode, a photo detector or any other element for emitting or detecting electromagnetic radiation.

For mounting optical fibers to a fiber coupling device, a fiber coupling device comprises fiber coupling elements such as V-shaped or U-shaped grooves to which optical fibers, with their circumferential surfaces and/or fiber end surfaces, can be mounted. Fiber mounting often involves applying a glue or an adhesive material to the grooves. Precise alignment depends on how precisely the respective groove is aligned to the respective optoelectronic or photonic chip and, in particular, to the active element arranged on it. Since each chip has to be mounted on the support substrate, offsets of the position and/or orientation of a chip often causes misalignments, thus significantly decreasing the percentage of radiation actually transferred between the active element and the fiber end-piece facing it. However, for optimum coupling efficiency between the fiber end-piece and the active element, the loss of transmitted signal intensity must be minimized.

Alignment between the position of the active element and the position of the fiber end-piece as predefined by the position of the respective groove, conventionally involves time-consuming and/or complicated alignment processes. It is still an issue how to ensure proper alignment and efficient fiber coupling with minimum effort and costs of the fiber coupling device.

In addition, with increasing signal rates of 20 Gbit/s and beyond, the dimensions of the active elements, such as photo diodes, for instance, are getting smaller and especially smaller than the cross-section of the fiber core of optical fibers to be coupled to them. As a consequence, with reduced dimensions of the active area, the issue of proper alignment is getting even more crucial, since the degree of signal loss, that is the degree of decrease in coupling efficiency in terms of transmitted light intensity, caused by comparatively small amounts of offsets or misalignments, is larger than in case of active elements having wider active area surfaces. Conventional devices have active elements with an active area of roughly the same size, i.e. cross-section or lateral extension, as the fiber core, such as 70 to 80 µm, for instance. High data-rate fiber coupling devices designed for transmission of signals of up to 20 Gbit/s or more, however, may comprise active elements with lateral extensions being no more than 70% or even 50% of that of the fiber core. Accordingly, since proper alignment is rendered even more critical, costs and/or efforts for proper alignment are increasing, due to the reduced active area surface.

It is an object of the present application to provide a fiber coupling device allowing proper fiber alignment, especially for smaller-dimensioned active areas for increased signal transmission rates. At the same time, the aligning of the fibers to the active elements shall be rendered easier and less costly. Furthermore, automatic alignment of the optical fiber, when finally mounted to the fiber coupling device, shall be enabled, even in case of extremely small active area dimensions below the cross-section of the fiber core.

The application provides a fiber coupling device according to claim 1.

Some exemplary embodiments are described herein below with reference to the figures.

FIGS. 5A and 5B show further cross-sectional views of an optoelectronic or photonic chip and of a fiber end-piece engaging with a second fiber coupling element.

FIGS. 6A to 6C show exemplary shapes of fiber end-pieces couplable to an active element of the fiber coupling device.

Figure 1:
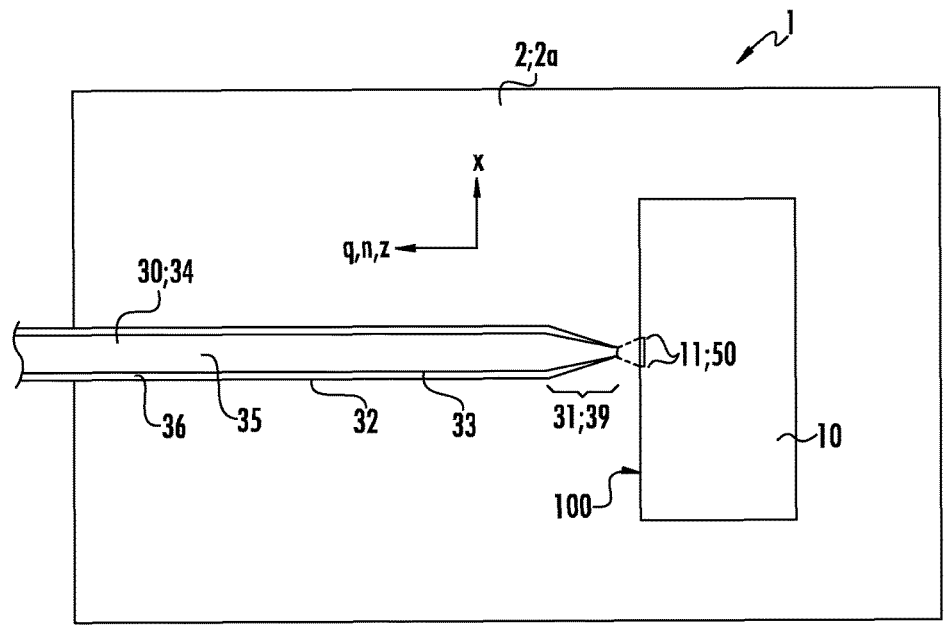
FIG. 1 shows a fiber coupling device having at least one optoelectronic chip with an active element to be coupled to a tapered optical fiber.

FIG. 1 shows a schematic top view on a fiber coupling device 1. The fiber coupling device 1 comprises a mounting substrate 2 with a mounting surface 2a on which at least one optoelectronic or photonic chip 10 is mounted. The at least one chip 10 comprises a main surface 100 on which at least one opto-electronic and/or photonic element 50 is formed.

The fiber coupling device 1 is designed for coupling to at least one optical fiber 30. Therefore, a fiber is to be mounted and a fiber end-piece 31 thereof is to be positioned relative to the corresponding optoelectronic or photonic element 50, i.e. relative to its active area surface 11, such that maximum signal transmission, i.e. maximum coupling efficiency, between the fiber end-piece 31 and the active element 50 is achieved. To this end, an elongate fiber section 34 close to the fiber end-piece 31 is glued to a V-shaped or U-shaped groove, which groove may be provided in, on or above the mounting surface 2a, for instance a pedestal or in another kind of support structure mounted on the mounting surface 2a of the mounting substrate 1.

In the exemplary fiber coupling device 1 of FIG. 1, the optoelectronic or photonic chip 10 is mounted with one of its side surfaces to the mounting surface 2a such that the main surface 100 of the chip 10 is facing the fiber end-piece 31.

Alternatively, the chip may be mounted, with its surface opposite to the main surface 100, to the main surface 2a, in which case the normal direction of the main surface 100 of the chip 10 representing the vertical direction z relative to the active area surface 11 will be perpendicular to the mounting surface 2a of the mounting substrate, i.e. normal to the drawing plane of FIG. 1, rather than parallel to the mounting surface 2a as illustrated in FIG. 1. The fiber end-piece 31 will then be arranged on top or above the chip 10.

Furthermore, with both chip orientations, there may be various designs and geometries of the fiber end-piece 31. Whereas in FIG. 1, the fiber end-piece 31 is illustrated to be tapered or tapering towards the active area surface 11, instead or additionally the fiber end-piece may be bulged and/or cleaved. A bulge or ball is a molten and then solidified region of fiber material which assumes, when heated, a spherical or at least curved, bulging shape of its outer surface. Such a bulge or ball at the distal end of the fiber end-piece 31 acts as a lens and thus focuses a beam of light when passing it. A cleaved reflection surface, such as at an angle of between 40° and 50°, especially 45°, relative to the axial direction a of the fiber, may additionally be formed at the fiber end-piece 31, especially at its bulge, so as to internally reflect a beam of light inside the fiber end-piece towards or from the active area surface 11 of an active element 50. Such a fiber end-piece design with a bulge or ball with an inclined reflection surface may especially be used when the fiber end-piece 31 is to be arranged above the optoelectronic chip 10, i.e. more remote from the mounting substrate 2.

However, in all these cases, the groove underneath the elongate fiber section 34 often does not ensure a sufficient alignment of the fiber end-piece 31 with regard to the optoelectronic or photonic element 50, since each chip 10 (of which only one chip is shown in FIG. 1 for simplicity) may be arranged on the support substrate 2 at a position slightly offset compared to its optimum default chip position. Accordingly, there may be positional and/or orientational offsets of each respective optoelectronic and/or photonic chip 10 relative to the substrate 2 which cannot be compensated by the grooves underneath the elongated fiber section 34, in particular not individually. As a consequence, a mismatch or misalignment between the positions and/or orientations of the fiber end-piece 31 and those of the active elements 50 are likely to occur. Especially when the extensions of the active area surface 11 in lateral directions with respect to the main surface 100 of the chip 10, that is parallel to the main surface 100, are designed significantly smaller than the cross-sectional diameter of the fiber core 35, even small misalignments will cause large signal losses, especially for photo diodes or other active elements designed for signal transmission rates of more than 10 Gbit/s.

Figure 2:
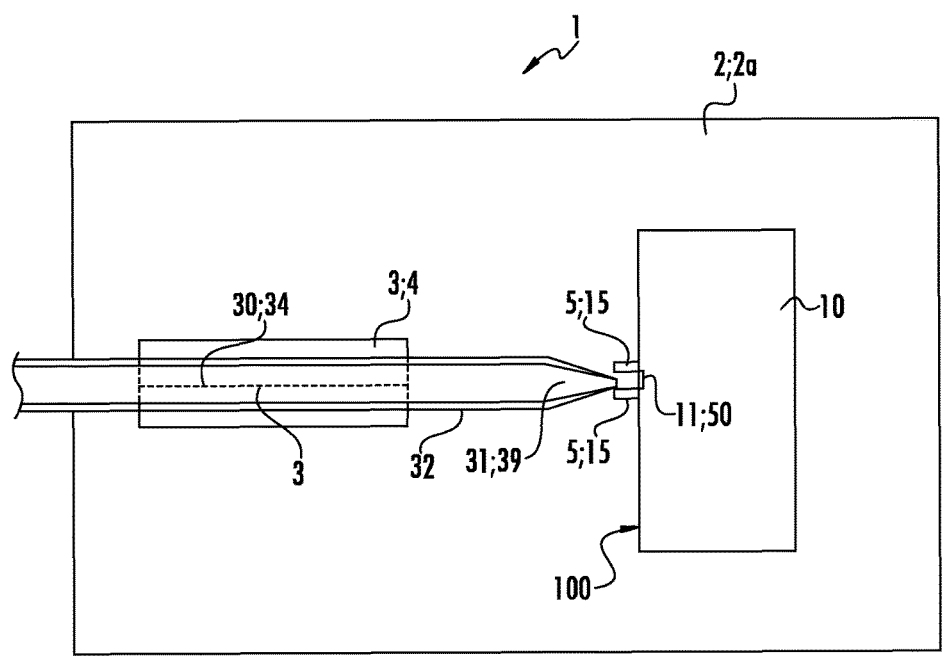
FIG. 2 shows a fiber coupling device with a smaller active element for increased signal transmission rates, having an improved construction for reliable coupling at increased signal transmission rates.

FIG. 2 shows an improved fiber coupling device 1. In contrast to FIG. 1, the lateral dimension of the active area surface 11 in the direction x and/or y is reduced, due to an increased signal transmission rate that may be between 10 and 60 Gbit/s. As a consequence, the lateral dimension of the active area surface 11 may for instance be less than 70% or even smaller than 50% of the standard cross-sectional diameter of the fiber core 35 of standardized optical fibers. For instance, the fiber coupling device 1 may be designed for coupling optical fibers 30 having a cross-sectional diameter of their circumferential fiber surface 32 of about 100 μm (including the fiber core 35 and the fiber cladding 36 surrounding it) and/or a cross-sectional diameter of the fiber core 35 alone of about 80 μm. Alternatively, the cross-sectional diameter of the circumferential fiber surface 32 may be about 125 μm (including the fiber core 35 and the fiber cladding 36 surrounding it) and/or a cross-sectional diameter of the fiber core 35 alone of about 50 μm or 62.5 μm. The fiber coupling device 1 may particularly be designed for coupling of multi-mode fibers. Even though the fiber end-piece 31 may be tapered and/or bulged so as to focus or at least concentrate the beam of light outside the fiber end-piece for locally reducing the beam diameter, nonetheless some tolerance regarding the relative position between the fiber end-piece and the active area surface 11 is required for avoiding high losses in coupling efficiency. With the reduced active area surface 11 of the optoelectronic and/or photonic active element 50 as indicated in FIG. 2, however, even small amounts of chip offsets, that is misalignments relative to the fiber end-piece position, will compromise efficient fiber coupling, since the focal spot is likely to be partially outside the active area of the optoelectronic or photonic element 50.

The fiber coupling device of FIG. 2 comprises a first fiber coupling element which may have a conventional design, such as a V-groove or U-groove, for instance. The first fiber coupling element may, for instance, support, contact and/or pre-align a circumferential fiber surface 32 of an elongated fiber section 34 close to, but distinct from the fiber end-piece 31.

According to the present application, the fiber coupling device 1 additionally comprises at least one second fiber coupling element 5 which is designed to receive a fiber end-piece 31 of an optical fiber 30 and which is mounted in a position aligned relative to the active element 50, thereby ensuring maximum optical coupling between the active element 50 and the fiber end-piece 31. Due to the provision of the second fiber coupling element 5 which may be grown on, mounted to or otherwise formed on or attached to the opto-electronic and/or photonic chip 10 directly, especially with no further constructional elements provided in-between, the second fiber coupling element 5 automatically ensures that the fiber end-piece 31 approaches the main surface 100 of the chip 10 close to the position of the active area surface 11 of the active element 50 will automatically be guided towards the optimum, predefined fiber end-piece mounting position, particularly along one or, two lateral directions parallel to the main surface of the chip, and, optionally, also to an optimum distance, along the normal direction of the main surface of the chip.

In the present application, the terms lateral and vertical always refer to the main surface 100 of the chip 10, regardless of the orientation in which the chip is mounted on the mounting substrate 2.

The second fiber coupling element 5 may, for instance, comprise an elevated structure 15 or a plurality of elevated structures 15 arranged on the main surface 100, which are arranged near and/or around the active element 50. As soon as the fiber end-piece 31, during insertion or mounting of the fiber 30, abuts the second fiber coupling element 5, the presence of the second fiber coupling element 5 will force the fiber end-piece 31 into the predefined final fiber end-piece position relative to the active element 50, thereby preventing signal losses during operation of the fiber coupling device 1 once the optical fiber 30 or plurality of optical fibers has been connected to it.

The second fiber coupling element 5 thus brings the fiber end-piece 31 into the predefined optimum coupling position next to or above the active element 50 on the main surface 100 of the chip. When the optical fiber approaches the opto-electronic chip 10 during fiber mounting, the fiber end-piece 31, upon engagement with the second fiber coupling element 5, will be guided the second fiber coupling element 5 towards the fiber end-piece coupling position, since the second fiber coupling element 5 will displace the fiber end-piece 31 from regions laterally surrounding the active area of the active element 50. The optimum coupling position is a centered position with regard to the active area surface 11 of the active element 50, for instance at a predefined distance d' (see FIG. 5A) from it along the normal direction of the main surface 100. Accordingly, in the final, optimum fiber end-piece position, the fiber end-piece 31 may also have the optimum, predefined distance d' from the active element 50 and, more important, will not have any lateral offset, along the lateral directions x, y parallel to the main surface 100, which lateral offset would reduce coupling efficiency. Since the second fiber coupling element 5 forces the fiber end-piece 31, when approaching the chip 10, into a position free of any lateral offset relative to the active element 50, the second fiber coupling element 5 thereby eliminates or at least compensates any misalignments between the active element 50 and the fiber end-piece 31 facing it. When the fiber coupling device 1 is manufactured or assembled, due to manufacturing tolerances or design tolerances of its component parts, positional and/or orientational chip offsets may occur. However, at least at the end of the assembling process, when a fiber end-piece 31 is approaching and contacting the second fiber coupling element 5, such misalignments or offsets are then eliminated and/or compensated, since the fiber end-piece 31 and/or a portion of an elongate fiber section 34 closest to it will be bent or otherwise be guided until the fiber end-piece 31, particularly the tip of it, finally assumes the predefined, optimum coupling position relative to the active element 50.

Since the second fiber coupling element 5 may be mounted, attached and, particularly, grown on the optoelectronic and/or photonic chip 10 directly, particularly in the stage of wafer level or substrate level processing where the active elements 50 and/or the active area surfaces 11 are fabricated, the second fiber coupling element 5 or the plurality of second fiber coupling elements 5 will automatically be self-aligned with regard to the active elements 50, i.e. to their active area surfaces 11. Upon singulating of the wafer, panel or other kind of substrate, a plurality of chips 10 is obtained, each chip 10 having a main surface 100 comprising at least one respective optoelectronic and/or photonic active element 50 and further comprising one or a plurality of second fiber coupling elements 5 surrounding the respective active element 50. By means of substrate level formation of the second fiber coupling elements 5, any mismatch or misalignment between the active element 50 and the surrounding second fiber coupling element or elements 5 may be prevented and/or reduced from the beginning, the more so as substrate level manufacture is executably with an accuracy in the range of microscopic dimensions, i.e. with lateral deviations much smaller than the typical cross-section of optical fiber cores. Accordingly, wafer level manufacture of the second fiber coupling elements 5 on the main surface 100 comprising, or designed to later comprise, the active elements 50, will automatically reduce any residual misalignment between the active element 50 and the center of the surrounding second fiber coupling elements 5 to extremely small amounts.

FIGS. 3A to 3D show some exemplary embodiments regarding the lateral shape of the second fiber coupling element 5 or elements across the main surface 100 of the optoelectronic and/or photonic chip 10. FIGS. 3A to 3D particularly show a top view on the chip main surface 100 on which an active area surface 11 of an active element 50 (photo diode, VCSEL, laser diode, photo detector, etc.) is provided. According to FIG. 3A, the active element 5 is surrounded by one circular, that is ring-shaped or annular second fiber coupling element 5. The first fiber coupling element 4 of FIG. 1 or 2 is not shown in FIGS. 3A to 3D since it is not arranged on the chip 10 or on its main surface 100. Instead, the first fiber coupling element is located further away from the chip 10, for instance somewhere on the mounting surface 2a of the support substrate 2 or of a further substrate or pedestal, so as to support and, optionally, roughly pre-align a portion of an elongate fiber section disposed at a small, but non-zero distance from the fiber end-piece.

Although in FIGS. 3A to 3D the chip 10 may comprise more than only one active element 50, for instance a plurality of four or another number of photo diodes or VCSELs of the same kind, one optoelectronic and/or photonic active element 50 is provided on each chip 10. In FIGS. 3A to 3D and in the further figures, chips with only one respective active element 50 are shown for simplicity of illustration.

Figure 3A:
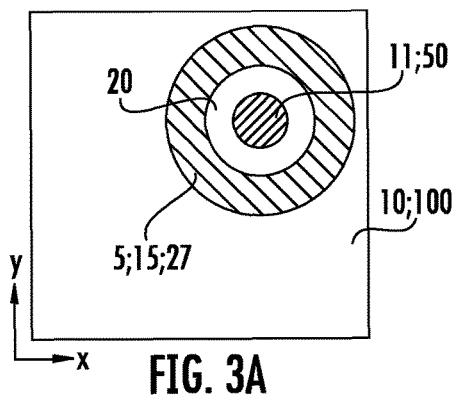
FIGS. 3A to 3D show exemplary embodiments of second fiber coupling elements mounted to a main surface of a chip.

The chip 10 shown in top view in FIG. 3A may be mounted to the support substrate 2 (such as a printed circuit board, for instance), with its rear surface or, alternatively, with one of its side surfaces shown as edges in FIG. 3A. Whereas along the two lateral directions x, y parallel to the main surface 100, the second fiber coupling element 5 completely surrounds the active element 50 from all lateral directions. Along the normal direction extending vertically relative to the main surface 100 of the chip 10, the second fiber coupling element 5 extends above the main surface 100. Whereas the active area 11 or its outermost layer may form a shallow elevation or depression of merely 1 or 2 μm at maximum above or below the surrounding main surface, the second fiber coupling element 5 extends significantly above the main surface 100 so as to form an elevated structure 15 reaching from the main surface 100 to a height h above the main surface 100 (see FIG. 4A). The height, that is the vertical extension of the second fiber coupling element 5 in the direction perpendicular to the chip main surface 100, is chosen according to the respective shape of the fiber end-piece 31; particularly it is chosen such that, upon mechanical contact and/or engagement of the fiber end-piece 31 with the second fiber coupling element 5, the fiber end-piece 31 is moved towards a centered position near the optoelectronic active element 50 so as to maximize coupling efficiency.

The second fiber coupling element of FIG. 3A thus is a protrusion 27, such as a stud 25 or ridge, and thus forms a ring around the active element 50. The fiber coupling element 5 surrounds a through-hole 20 through which the fiber end-piece may access or approach, at least to a predefined distance d' (see FIG. 5A) from the main surface 100 being smaller than the height h of the second fiber coupling element 5, the exposed active element 50.

Figure 3B:
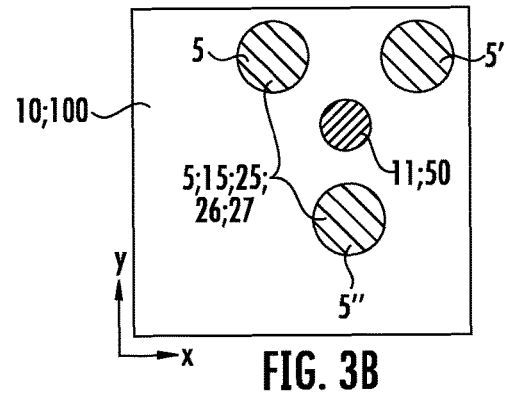
Figure 3C:
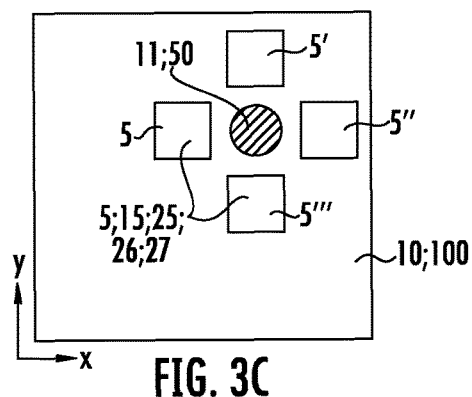
Figure 3D:
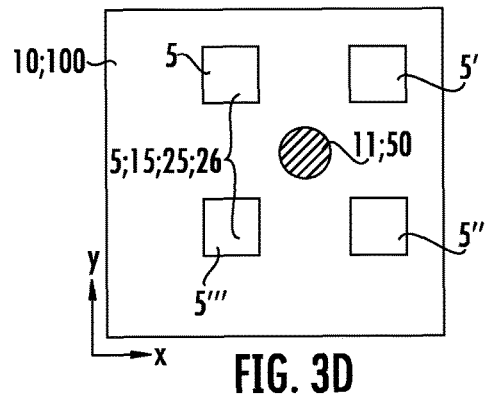

FIGS. 3B to 3D show some alternative, exemplary embodiments regarding the design, number and position of the at least one second fiber coupling element 5. According to FIG. 3B, the second fiber coupling element 5 is a plurality of second fiber coupling element 5, 5', 5", comprising three elevated structures 15, such as studs 25 or columns 26, which are symmetrically arranged around the active area surface 11 of the active element 50. Since the triple of elevated structures 15 likewise extends to a certain height h above the main surface 100, again the fiber end-piece 31 is automatically directed between them towards the lateral position of the active area surface 11, at least if the initial lateral offset between the second fiber coupling arrangement and the approaching fiber end-piece 31 along the lateral directions x, y is not too large.

According to the embodiment of FIG. 3C, four separate second fiber coupling elements 5, 5', 5", 5''' are symmetrically arranged around the active element 50. Along each lateral direction x, y, the active element 50 is thus surrounded by two respective second fiber coupling elements. Each second fiber coupling element may be an elevated structure 15, such as a stud 25 or a column 26, a pillar, a ridge or any other appropriately shaped elevation or protrusion 27.

According to FIG. 3D, the second fiber coupling element is represented by four separate elevated structures 15, for instance those of FIG. 3B or 3C. However, in FIG. 3D, the four studs 25 or protrusions 27 are arranged at positions located at lateral, diagonal distances from the active area surface 11, i.e. diagonally with regard to the edges of the main surface 100.

Figure 4A:
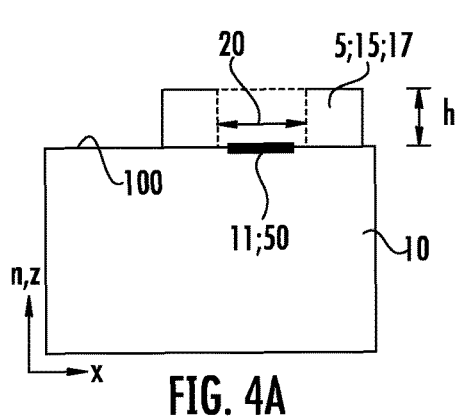
FIGS. 4A and 4B show sectional side views of the exemplary optoelectronic or photonic chips shown in FIGS. 3A and 3D.
Figure 4B:
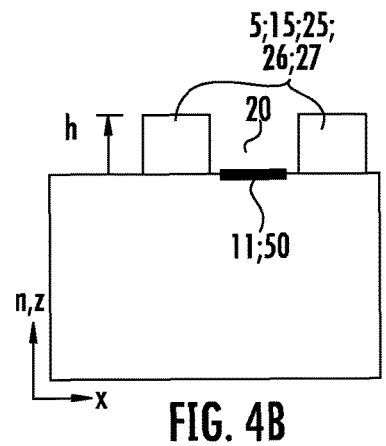

FIGS. 4A and 4B show sectional side views of the exemplary optoelectronic or photonic chips 10 shown in FIGS. 3A and 3D. In the sectional views, the height h of the respective fiber coupling element 5, i.e. of the elevated structure or structures 15 is shown. As in all figures of the present application, the dimensions, distances and/or proportions are not necessarily to scale. The height h or normal extension of the elevated structures 15 constituting the second fiber coupling element 5 may be between 5 µm and 500 µm, such as between 20 µm and 100 µm. A through-hole 20 (as shown in FIG. 4A) or, alternatively, one or plural gaps (as shown in FIG. 4B) has or have the same height h as the at least one second fiber coupling element 5. The through-hole 20 or gap is located in a center region, ideally without any lateral offset relative to the active element 50. At the lateral position of the through-hole 20 or gap, a fiber end-piece 31 or at least a tip of a fiber end-piece 31 may be partially inserted so as to approach the active element 50 to a distance d' (FIG. 5A) smaller than the height h of the second fiber coupling element or elements 5. Nonetheless, this distance d' is predetermined by the height h, that is extension along the normal direction, of the at least one second fiber coupling element 5 or elevated structure 15 above the main surface 100.

FIGS. 5A and 5B show further cross-sectional views of the optoelectronic or photonic chip 10 with a fiber end-piece 31 engaging with the (second) fiber coupling element 5. According to FIG. 5A, the optical fiber 30, apart from its elongated fiber section 34, comprises a fiber end-piece 31 which is tapered or tapering, thus comprising a tip of reduced radial cross-section. The optical fiber 30 comprises a fiber core 35 and a fiber cladding 36 surrounding the fiber core 35. At the fiber end-piece 31, the cross-sections or radii of the fiber core 35 and of the fiber cladding 36 are shrinking to a respective minimum radius at the outermost, distal tip of the fiber end-piece 31 facing the optoelectronic and/or photonic chip 10.

When the fiber 30, during fiber mounting, approaches the main surface 100 of the chip 10, as long as the lateral misalignment along the directions x and/or y is not too large, the conical or otherwise tapering outer surface of the fiber end-piece 31 will contact the second fiber coupling element 5 or some of them somewhere on the inside, that is on their inner edge between the inner cylindrical surface and the annular top surface. Upon further approaching to the active element 50, the tip of the fiber end-piece 31 will engage with the fiber coupling element 5, i.e. it will slidably move relative to it towards a position laterally centered relative to the active area surface 11. Thereby, the second fiber coupling element 5 formed as an elevated structure 15 on the main surface 100 of the chip 10 will automatically ensure alignment of a fiber end-piece 31 with respect to the active element 50 with a higher accuracy than achievable by means of the first fiber coupling element 4 alone. Even in case that there are offsets or misalignments between the chip 10 and the mounting substrate 2, between the mounting substrate 2 and the first fiber coupling element (not shown in FIG. 5A) and/or between the first fiber coupling element and the elongate fiber portion to be glued to it, such misalignments are removed, since the elevated second fiber coupling element 5 will bend the fiber end-piece such that it or at least its tip will assume the laterally centered, optimum coupling position aligned with the optoelectronic active element 50. Accordingly, the fiber coupling device 1 may be assembled with some tolerances, since during fiber mounting moderate lateral misalignments of the fiber end-pieces are corrected by means of the corresponding second fiber coupling element 5.

FIG. 5B shows another embodiment in which the fiber end-piece 31 comprises a bulge 37 in the form of a sphere, ball or another drop-like element forming the tip or end of the fiber end-piece 31. Due to the bulge 37, which is normally fabricated by locally and/or temporally heating the fiber material above its melting temperature, a lens surface is formed which focuses or at least concentrates a beam of light passing it. In FIGS. 5A and 5B, the fiber end-piece 31 is tapered. In FIG. 5B, tapering as well as formation of a bulge 37 are combined. Thereby, a small bulge or sphere may be formed whose diameter is larger than the narrowest portion of the conical or otherwise tapering fiber end-piece 31, but which is still smaller in diameter than the elongate fiber section 34. Alternatively, the bulge may also be larger than the elongate fiber section 34, as shown in FIG. 6C, for instance.

FIGS. 6A to 6C show exemplary shapes of fiber end-pieces 31 couplable to the active element of the fiber coupling device 1. The embodiments of FIGS. 6A and 6B correspond to those shown in FIGS. 5A and 5B. FIG. 6C shows another exemplary shape of a fiber end-piece 31 which comprises a bulge 37, but without being tapered. The diameter of the ball or bulge 37 is larger than the diameter of the optical fiber 30. In FIGS. 6A to 6C the caustic, that is the outer shape or perimeter of the radiation beam outside the fiber end-piece, is locally thinner than the tip of the fiber end-piece. The respective distance where the diameter or waist of the radiation beam 40 in front of the fiber end-piece 31 is the smallest is the optimum distance to be adjusted between the fiber end-piece 31 (or its tip facing away from the elongate fiber portion 34) and the active area surface 11. Accordingly, the height h of the at least one second fiber coupling element 5 may be chosen such that the axial distance between the tip of the fiber end-piece 31 and the active element surface 11 exactly corresponding to this optimum distance d. Also in FIG. 6A, an optimum distance may be predefined which may, for instance, be smaller, but finite.

Optical fibers 30 shaped as shown FIGS. 6A and 6C, for instance, will approach, during fiber mounting, the main surface 100 of chip 10 along its vertical direction z, that is along its normal direction n in FIGS. 5A and 5B. The chip 10 may either be mounted with one of its side surfaces to the mounting surface 2a of the mounting substrate 2, so that the elongate fiber portion 34 extends parallel to the mounting surface 2a, or may alternatively be mounted, with its opposite rear surface, to the mounting surface 2a of the mounting substrate 2.

The desired shape of the fiber end-piece 31 may be formed in advance using appropriate splicing equipment. Optionally, the fiber end-piece 31 or a bulge 37 or ball thereof may be cleaved, particularly cleaved at an angle of between 40° and 50°, for instance 45°, relative to the axial direction a of the optical axis of the optical fiber 30. Thereby, an optical turn is obtained due to the reflection by about 90° at the inclined reflection surface 38 at the ball or bulge 37. The inclined reflection surface 38 may be formed by cleaving or by laser processing.

Accordingly, the fiber coupling device 1 described in the present application may be coupled to any optical fiber or fiber end-piece or to a plurality of them so as to obtain a coupled fiber coupling device assembly ready for use in a fiber network. The optical fibers 30 may, for instance, be fibers for a very short distance network (VSDN) whose individual fiber lengths are all less than 100 m. Alternatively, fibers optimized for data transmission for longer lengths may be used (OM1-OM4). Furthermore, the fibers couplable by the fiber coupling device may be single-mode fibers or multi-mode fibers.

If an inclined mirror surface 38 is provided at the fiber end-piece, an optical turn by about 90° is achieved. The radiation beam may be either totally be reflected inside the ball or bulge 37 (total internal reflection; TIR) or may be reflected non-totally at an interface surface between the fiber core at a reflective interface surface 38 and at least one mirror layer or mirror layer stack covering the inclined reflection surface 38.

In all embodiments, inside the optical fiber, the beam of radiation 40 is confined to the fiber core 35. Depending on the respective shape or arrangement of the at least one second fiber coupling element 5 chosen, a fiber end-piece 31 to be coupled to the chip 10 may be spliced and shaped correspondingly. In those embodiments of fiber end-pieces comprising a bulge 37, the beam of light 40 exiting the bulge 37 will first be focused to be smaller in diameter than the fiber core 35, before the radiation beam 40 diverges with increasing distance from the fiber end-piece 31 (see FIGS. 6B and 6C). By a tapering shape of the fiber end-piece, the local minimum beam diameter of the radiation beam 40 outside the fiber end-piece may be reduced further.

Generally, as regards the at least one second fiber coupling element 5 of any embodiment of the application, i.e. regarding the at least one elevated structure 15 on the chip main surface 100, it may be formed of a polymer, such as a polyamide, for instance. Alternatively, it can be formed of a metal or metal allow, or of an insulator. The material of the at least one second fiber coupling element 5 may be either transparent or intransparent for the radiation to be transmitted by the optical fibers (such as visible light or infrared radiation, for instance) without obstructing light propagation, since the at least one second fiber coupling element 5 is provided and/or extends exclusively laterally outside the active area surface 11 of the optoelectronic or photonic active element 50.

As a further option, the through-hole 20 or gap enclosed by the fiber coupling element 5 of FIG. 5A or 5B, between the active area surface 11 and the tip of the fiber end-piece 31, may be filled with a transparent filling material such as an adhesive or glue. At least in case of a ring-shaped, protruding fiber coupling element 5 (FIGS. 3A and 4A), this is feasible optional feature for FIGS. 5A and 5B.

In FIG. 6A, the tip of the fiber end-piece 31 is curved or rounded, thereby also effecting focusing for at least locally reducing the beam diameter. At the tip of the fiber end-piece 31, the beam diameter in lateral direction is even smaller than in the examples of FIGS. 6B and 6C. Furthermore, the core diameter of the fiber core 35 at the tip of the fiber end-piece 31 is smaller compared to FIGS. 6B and 6C. For these and other shapes of the fiber end-piece 31, beginning from the moment when the fiber end-piece 31 abuts, i.e. contacts and/or engages with the at least one protruding second fiber coupling element 5, as soon as the fiber end-piece 31 further approaches the chip main surface 100, it is laterally moved so as to be forced into the optimum fiber end-piece coupling position in which no or almost no lateral misalignment between the tip of the fiber end-piece 31 (or, in case of an obliquely cleaved ball effecting an optical turn by about 90°), between the closest, bulged region of the fiber end-piece 31) and the optoelectronic and/or photonic active element 50 does occur. Thus, the at least one second fiber coupling end-piece 5 ensures correct alignment of the fiber end-piece 31 to the active area 11 and ensures high-precision lateral alignment and/or the optimum end-piece-to-chip-distance, thus additionally acting as a spacer which preserves the optimum distance between the fiber end-piece 31 and the active element 50. The focal spot can thus match the position and dimensions of the active area 11 of the high-speed active element 50.

Figure 7:
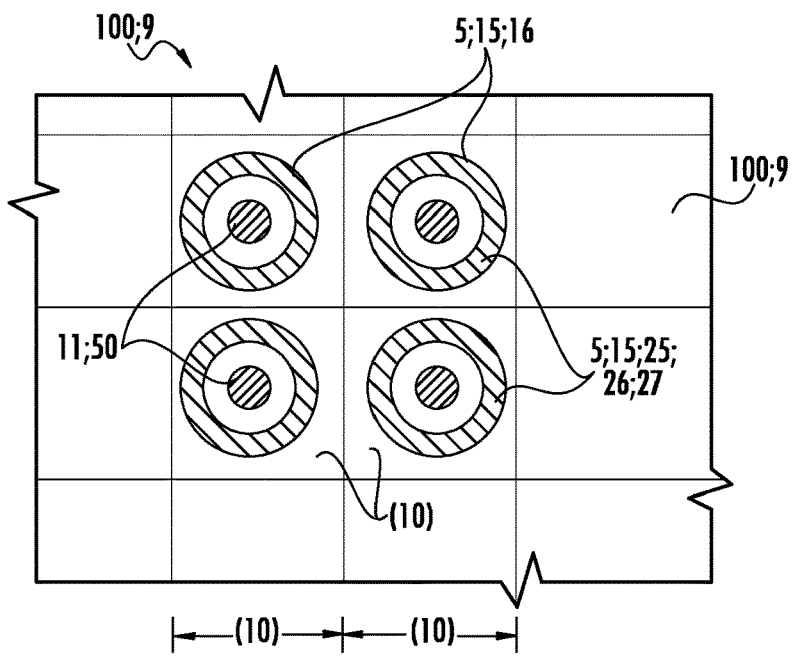
FIG. 7 shows a substrate to be treated by imprint techniques applicable on a substrate level basis, prior to singulation into a plurality of electronic chips.

Fabrication of the second fiber coupling element or elements 5 may be performed using any applicable conventional technique. For instance, standard imprint techniques on a wafer level basis, that is substrate-level or panel-level basis, may be applied. Accordingly, a substrate 9 destined to be singulated into a plurality of electronic chips 10, as illustrated in FIG. 7, may be treated prior to singulation in order to form a plurality of fiber coupling elements 5 each being self-aligned relative to the respective active area surface 11 of the active element 50. An imprint technique applied for forming the elevated structures 15, that is the second fiber coupling elements 5, may involve locally stamping a polymer material or another appropriate material onto regions around each active area surface 11.

For instance, a patterned stamp comprising a plurality of recesses may be used, which recesses are pressed on predetermined positions of the main surface 100 of a substrate, for instance a substrate sufficiently large for yielding a matrix of 10 by 10 chips. Upon stamping the stamp onto the main surface 100 of the substrate 9 (portions of which later will form the main surface 100 of any respective chip 10), the polymer material adheres more strongly to the main surface 100 of the substrate 9 than to the recesses in the stamp.

Alternatively, also a reflow process may be applied; for instance a reflow process which comprises depositing a polymer on slightly raised, i.e. shallow pedestals or other kinds of elevations of the substrate main surface 100. The height of the pedestals or elevations need only be a few micrometers or even less than a micrometer. When heated, the polymer on top of them will melt and adopt a semispherical or otherwise bulged and/or convex shape. After cooling, the bulging polymer structures protrude above the substrate, i.e. beyond the top of the pedestals or elevations. Due to surface tension of the heated polymer, the polymer or polymer drop does not flow off the pedestal during or after heating.

Accordingly, such polymer structures or further kinds of reflow structures may likewise be used as elevated structures 15 for alignment.

Optionally, those surface portions of the main surface 100 destined to be covered with the polymer material may shaped in advance so as to be raised, for instance by means of layer deposition and/or layer etching, so as to provide elevated contact surface portions which are then contacted selectively by the stamp. Once the second fiber coupling elements 5 have been formed on the main surface 100 of the substrate 9, the substrate 9 may be singulated, for instance diced, into a plurality of optoelectronic or photonic chips 10, each comprising one or plural active elements 50. One or plural chips 10 may then be mounted to the mounting substrate 2 shown (see FIG. 2, for instance) on which the first fiber coupling elements 4 are already mounted or will be mounted later. The first fiber coupling elements 4 serve to support and/or to provisionally pre-align the optical fibers 30, especially the elongate fiber portions 34, although the accuracy obtainable thereby is limited, but it may suffice to roughly pre-align the fiber end-piece somewhere above and/or within the second fiber coupling element or elements 5.

Alternatively to imprint techniques, the second fiber coupling elements 5 can also be formed by converting a polymerizable material into a polymer material, for instance by means of 3D laser scanning. For selective polymerization, two-photon-polymerization in a focal region of a laser beam may be exploited for precisely shaping the second fiber coupling element 5 on the chip 10. Further methods, such as those known from semiconductor manufacture or wafer processing, for instance, may be applied for manufacturing the second fiber coupling elements 5, particularly of self-aligned fiber coupling elements 5 on the chip surface 100. However, lithographic patterning will normally not be required due to the comparatively large dimensions of the desired second fiber coupling elements 5 which are between the millimeter range and the micrometer range.

Figure 8:
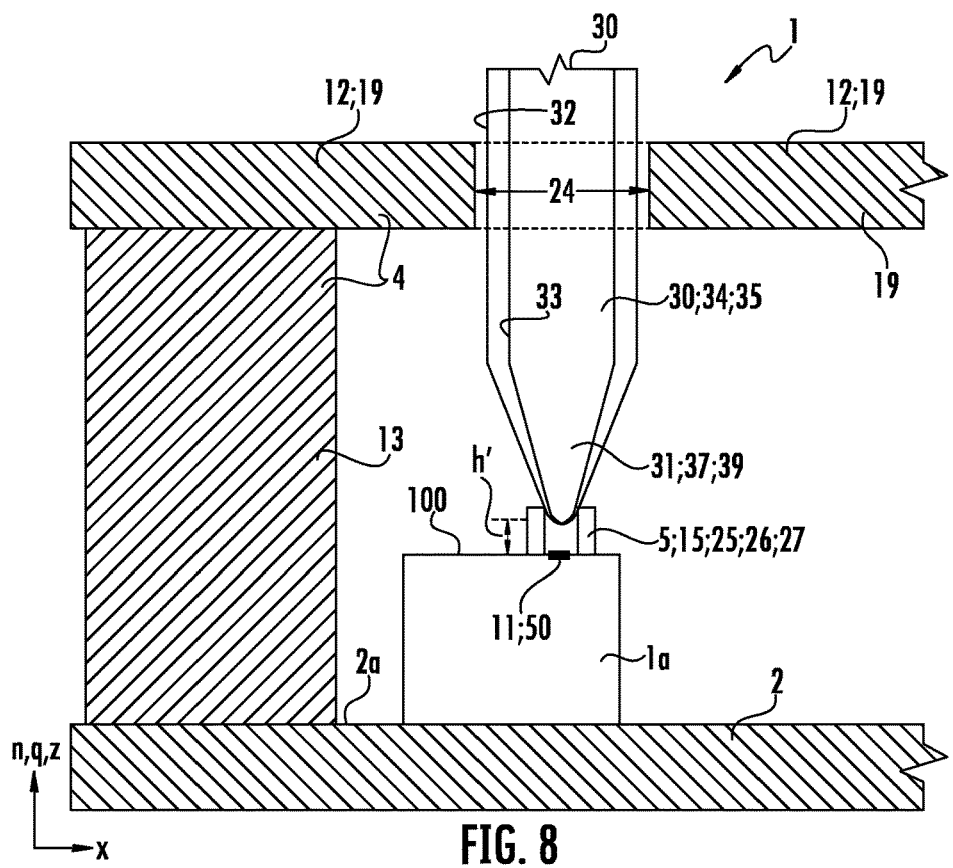
FIG. 8 shows an embodiment of a fiber coupling device in which the fiber approaches the main surface of the chip from its normal direction.

FIG. 8 shows another embodiment of a fiber coupling device 1 in which the fiber 30 also approaches the main surface 100 of the chip 10 from its normal direction n. Here, its normal direction at the same time is the normal direction of the mounting surface 2a of the mounting substrate, that is normal or vertical to the surfaces 2a and 100. Thus, the optical fiber 30 vertically approaches, along the normal direction which corresponds to the axial direction a of the fiber 30, the second fiber coupling element 5; 15; 25; 26; 27 which may, for instance, be designed according to any of FIGS. 3A to 5B. In FIG. 8, the first fiber coupling element 4 comprises an opening or clearance hole 24 (essentially a through-hole, but called differently to avoid confusion with the through-hole 20 in the annular second fiber coupling element 5 of FIGS. 4A and 5A). The clearance hole 24 may, for instance, be a via through a printed circuit board through which the fiber 30 is inserted and pushed first, before the fiber end-piece 31 begins to contact and/or engage with the at least one second fiber coupling element 5.

In FIG. 8, the first fiber coupling element 4 may, for instance, comprise a first support portion 12 extending parallel to the chip's main surface 100 and a second support portion 13 extending essentially perpendicular to the main surface 100 and serving to connect the first support portion 12 to the mounting substrate 2. The first support portion 12 may, for instance, be another, second mounting substrate 19 which, like the mounting substrate 2, may be a printed circuit board (PCB). The clearance hole 24 or opening may, for instance, be a via in the second substrate, and the fiber end-piece 31 and at least a portion of the elongate fiber section 34 may be inserted in and/or moved through the via provided in the first support portion 12. The second support portion 13 of the first fiber coupling element 4 may be any kind of support arm, pedestal or support structure. It may further comprise two or more separate support structures, such as arms or pedestals, so as to support the first support portion 12 in plural regions on or above the mounting surface 2a of the mounting substrate 2, for instance in two regions on opposite sides of the chip 10. The opening or clearance hole 24 in the first fiber coupling element 4 has a diameter or lateral extension being larger than the diameter or lateral extension of the outer circumference of the optical fiber. Accordingly, there is left a positional margin or play between the circumference of the optical fiber 30 and the inner sidewalls of the opening 24, thus allowing coarse pre-alignment to reduce major lateral offsets of the fiber 30 with respect to the active element 50. Though a certain degree of accuracy and, thus, a pre-alignment is achieved by the opening 24 in the first fiber coupling element 4, nonetheless the final, high-precision alignment with increased accuracy is achieved by means of the at least one second fiber coupling element 5 directly attached to the optoelectronic chip 10.

Whereas in FIG. 8 the axial direction of the fiber 30 and the normal direction of the main surface 100 of the chip 10 are perpendicular to the mounting surface 2a of the mounting substrate 2, alternatively the chip 10 and the fiber 30 may be mounted in a position rotated by 90° so as to enable light propagation along a horizontal direction parallel to the mounting surface 2a. In such an alternative embodiment (not illustrated), the axial direction of the elongate fiber section 34 and of the fiber end-piece 31 is horizontal and parallel to the mounting surface 2a and the chip is mounted with one of its side surfaces such that the main surface 100 extends perpendicular to the mounting surface 2a. The first fiber coupling element 4 may then be comprised of the first support portion 12 only, that is of a portion that surrounds or merely supports from the direction of the mounting substrate 2, the fiber or fibers 31 from below, whereas no second support portion 13 (i.e. no vertical support portion of the first fiber coupling element 4 in FIG. 8) is needed.

Furthermore, instead of an opening or clearance hole 24 such as of the upper, second printed circuit board, alternatively the second mounting substrate 19 may comprise a groove or a plurality of grooves instead of openings 24, and the grooves only need to partially surround the respective optical fiber 30 or elongate fiber portion 34.

Figure 9:
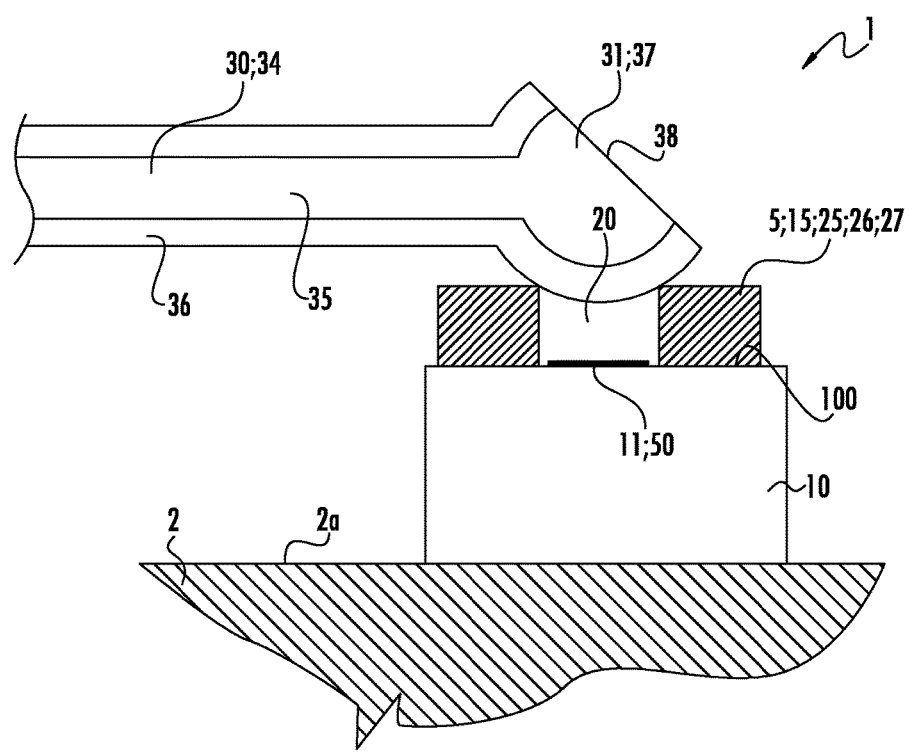
FIG. 9 shows an embodiment of a fiber coupling device for coupling to a fiber oriented parallel to the main surface of the chip.

FIG. 9 shows another embodiment in which the second fiber coupling element or elements 5 is or are designed for receiving and supporting a bulged fiber end-piece 31 having an inclined reflection surface 38 for reflecting the propagation direction of a beam of radiation 40 by an angle of between 80° and 100°, ideally by 90°. The inclined reflection surface 38 is formed by inclined cleaving or otherwise dividing the ball or bulge 37 at the end of the optical fiber 30. Whereas in FIG. 9 the bulge 37 is provided at an end of the elongate fiber portion 34 which has a uniform cross-section and/or diameter of its outer circumference and of its fiber core 35, alternatively a tapering fiber end-piece 31 may be provided at whose end portion a (smaller) ball or bulge 37 of fiber material may be provided, as shown in FIGS. 5B and 6B.

At the reflection surface 38, the beam is reflected inside the fiber material, either due to total internal reflection (TIR) or due to mirror layers (not shown) applied or manufactured on the inclined, cleaved surface where the bulge 37 has been cut through. Due to the optical turn achieved by the reflection surface 38 in FIG. 9, the propagation direction of light emitted by or to be detected by the optoelectronic or photonic element 50 may be normal to the mounting substrate 2, whereas the elongate fiber section 34 may be oriented parallel to the mounting substrate 2.

Figure 10A:
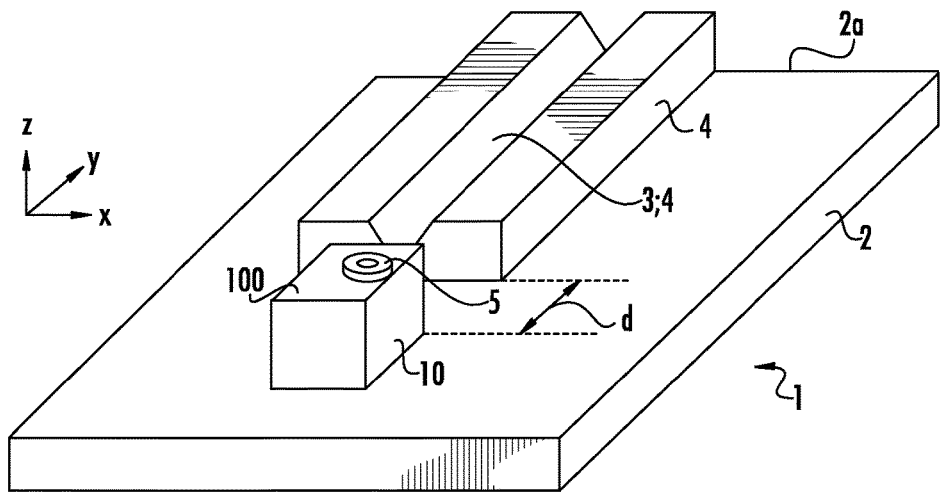
FIGS. 10A and 10B show a first embodiment of a fiber coupling device couplable to a fiber end-piece providing an optical turn.
Figure 10B:
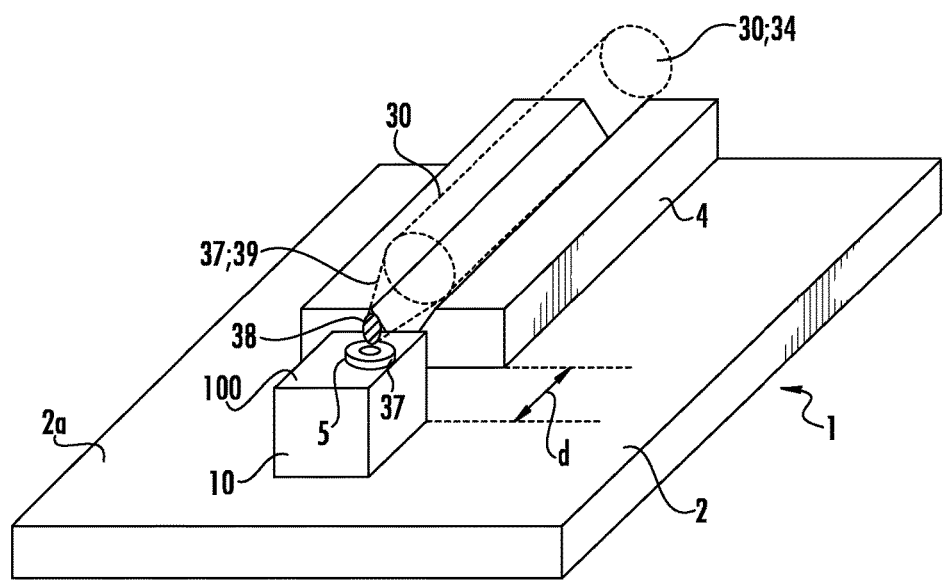
Figure 11A:
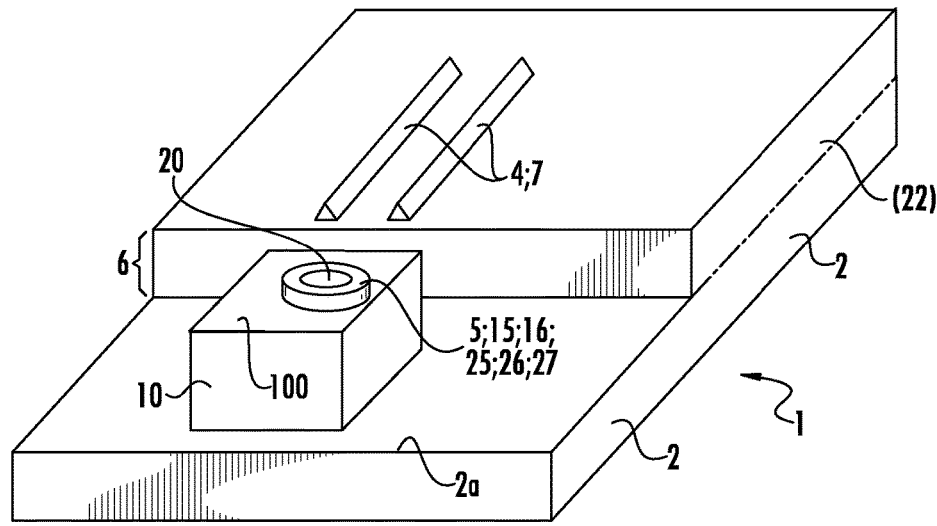
FIGS. 11A and 11B show a second embodiment of a fiber coupling device couplable to a fiber end-piece providing an optical turn.
Figure 11B:
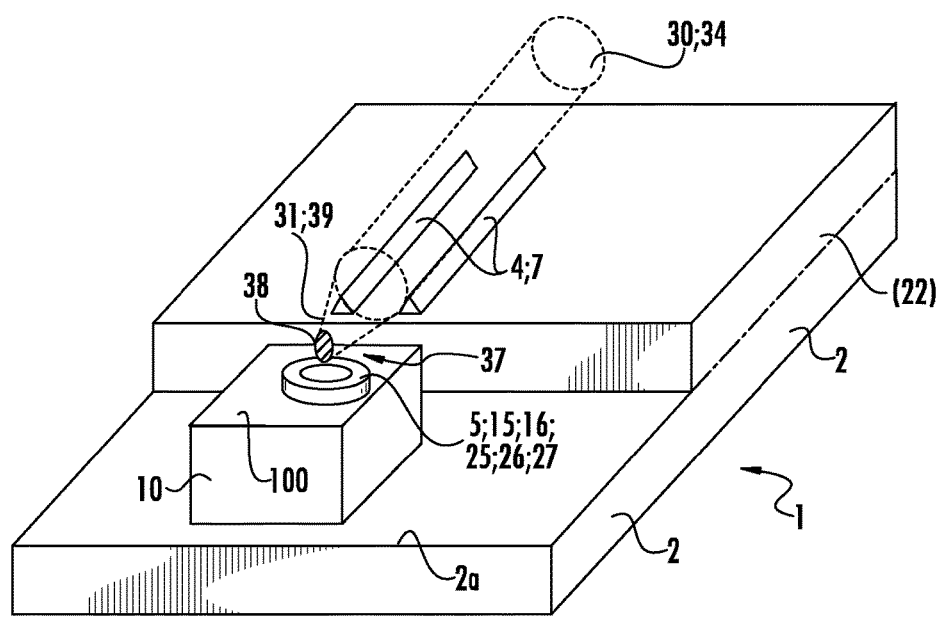

FIGS. 10A and 10B show an embodiment of a fiber coupling device 1 which may for instance be combined with the coupling design of FIG. 9 or with any other embodiment or combination of features where an optical turn is provided by the fiber end-piece. A further embodiment is shown in FIGS. 11A and 11B. In FIGS. 10A and 11A these embodiments of the fiber coupling device 1 are shown without the optical fiber, whereas the entire arrangement including the optical fiber is shown in FIGS. 10B and 11B.

FIG. 10A shows a perspective view of a first exemplary embodiment designed for an optical turn within a fiber end-piece. The fiber coupling device 1 comprises, on the mounting surface 2a of the mounting substrate 2, the chip 10 comprising the second fiber coupling device 5 on its main surface 100 which may, for instance, be formed annular so as to entirely surround the optoelectronic element 50 as depicted in FIGS. 3A and 4A. At a lateral distance d from the chip 10, the first fiber coupling element 4 is mounted on the mounting surface 2a for supporting and pre-aligning, at least with a moderate accuracy, the elongate fiber portion 34 of an optical fiber 30 (shown in dashed lines in FIG. 10B). The first fiber coupling element 4 is positioned and shaped such that an optical fiber 30 having a tapering fiber end-piece 31 comprising a ball or bulge 37 and further comprising an inclined reflection surface 38 is capable of being positioned such that a radial portion of the bulge 37 (opposite the reflection surface and facing the chip), when being positioned approximately above or at least close to the second fiber coupling element 5, will contact and/or engage with the second fiber coupling element 5 so as to be finally aligned in optimum position relative to the active area surface 11 of the optoelectronic active element 50. In FIG. 10A, the first fiber coupling element 4 comprises a groove 3 and is dimensioned such that the vertical position of the groove 3 is elevated compared to the mounting surface 2a of the mounting substrate 2, thus compensating for the height of the chip.

The vertical position of the groove 3 may be slightly smaller, i.e. lower than according to the optimum coupling position of the radial portion of the bulge 37 at the fiber end-piece 31. Thereby, the resilient material of the optical fiber 30, at or close to the fiber end-piece, interferes with the second fiber coupling element 5 and is slightly pressed upwards by the second fiber coupling element 5; in the direction away from the mounting substrate 2. This tensional force slightly bending the fiber end-piece 31 is exerted during fiber mounting, while the elongate fiber portion 34 is slidably pressed against the groove 3. When the fiber end-piece 31 is positioned closely enough to the through-hole 20 surrounded by the at least one second fiber coupling element 5 (or 5, 5, 5', 5" and 5'"), it will slide or slip into the through-hole 20. This is due to the tensional force inside the fiber end-piece 31 trying to move it back, i.e. closer towards the chip 10, due to the reduced, i.e. slightly too-small vertical position of the groove 3 of the first fiber coupling element 4. As soon as the fiber end-piece 31 engages with the at least one second fiber coupling element 5 (or 5, 5, 5', 5" and 5'") and slips into the through-hole 20 as deeply as possible, it assumes the predefined, optimum coupling position above the center of the active element 50.

FIG. 10B shows the fiber coupling device of FIG. 10A and, in dashed lines, an optical fiber 30 coupled to it. For moving to the optimum position of the fiber end-piece 31 relative to the active element 50, the elongate fiber section 34, which is provisionally pressed against or slidably glued against the groove 3 of the first fiber coupling element 4, first needs to be pushed or otherwise moved closer, in negative y-direction (FIG. 10A), towards the through-hole 20, since the bottom area of the bulge 37 still rests on and/or is slightly bent upwards by the upper surface of the second fiber coupling element 5 facing away from the chip 10. In FIG. 10B, along the azimuthal direction, i.e. in directions around the circumference of the fiber 30, the inclined reflection surface 38 is oriented such that it faces away from the mounting substrate 2 as much as possible.

The groove 3 of the first fiber coupling element 4 thus provides for coarse pre-alignment, whereas the self-aligned second fiber coupling element 5 directly protruding from the main surface 100 of the chip 10 ensures precision alignment of the fiber end-piece 31 relative to the optoelectronic and/or photonic element 50 with yet higher accuracy. In comparison with the embodiment of FIG. 2, the fiber end-piece 31 is arranged above the chip 10, rather than next to it in lateral direction, and the main surface 100 of the chip 10 in FIG. 10B is parallel to the mounting surface 2a of the mounting substrate 2.

FIGS. 11A and 11B show another embodiment of a fiber coupling device 1. The mounting substrate 2, on its mounting surface 2a, may comprise a step 6 or stair, for instance a shift in substrate thickness, for compensating the thickness or height of the chip 10. Accordingly, underneath the chip 10, the mounting substrate 2 may be thinner than in a surface area where the first fiber coupling element 4 is arranged. The vertical step 6 in-between compensates the thickness of the chip 10 in vertical direction, or nearly compensates it except for a slight vertical difference optionally provided for causing a tensional force similarly as explained for FIGS. 10A and 10B. As the first fiber coupling element 4, either a single structure comprising a groove or, alternatively, as shown in FIG. 11A, a pair or any number of guide structures for supporting and/or coarsely aligning the elongate fiber section 34 may be provided, for instance a pair of guide bars or other kinds of guide structures 7 combinedly supporting the elongate fiber portion. They can either be mounted to the mounting surface 2a, or the mounting surface 2a may be shaped to include the guide bars or guiding structures 7 from the beginning of their manufacture.

FIG. 11B shows the fiber coupling device 1 of FIG. 11A, on which the optical fiber 30 is arranged with its fiber end-piece 31 close to the optimum coupling position (similarly as shown in FIG. 10B), due to the presence of the second fiber coupling element 5 protruding above the main surface 100 of the chip 10. Again, the angle-cleaved reflection surface 38 provides for the optical turn by 90°. Optionally, as indicated by the dashed-dotted line, a pair of two separate substrates 2 may be used (instead of a single mounting substrate 2), that is a lower mounting substrate 2 and an upper, further substrate 22 which compensates or nearly compensates for the vertical extension of the chip 10. Both substrates 2, 22 are thus mounted on one another during assembly of the fiber coupling device 1.

The option of using two separate substrates 2, 22 has the benefit that the optical fiber 30 may first be mounted to the further substrate 22 and that the inclined reflection surface 38 can be formed, that is cleaved afterwards, when the fiber is already attached to the further substrate 22. Since, at the time of cleaving, the optical fiber 30 is already mounted to the further substrate 22, no rotational offset along the azimuthal direction can occur later. Thus, the inclined reflection surface 8 is oriented in the optimum direction ensuring the maximum angular distance from the direction pointing towards the mounting substrate 2 to be provided underneath.

Independently from the steps of mounting the optical fiber 30 to the further substrate 22 and from cleaving the reflection surface 38, the optoelectronic chip 10 may be mounted to the lower, larger mounting substrate 2. Both substrates 2, 22 prepared in this way can now be mounted to one another.

Figure 12:
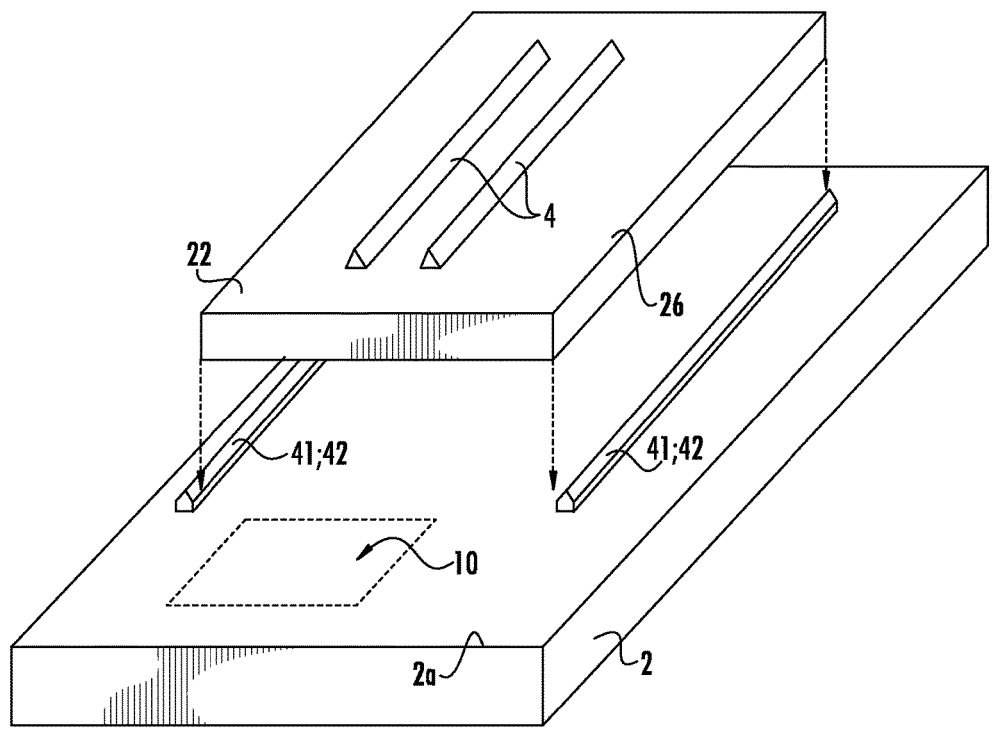
FIG. 12 shows an embodiment alternative to FIGS. 11A and 11B.

As shown in FIG. 12, for mounting of both substrates 2, 22 onto each other, third alignment structures 41, such as guide rails 42, may be provided on at least one of the substrates 2, 22, for instance, on the mounting surface 2a of the mounting substrate 2 (facing the upper, further substrate 22) and on the bottom surface of the upper substrate 22. In case that the lateral extension of the lower substrate 2 is larger or at least locally extending beyond those of the upper, further substrate 22, the alignment structures 41 on the mounting surface 2a of the lower substrate 2 may be also or exclusively be provided outside the lateral extension of the upper substrate 22. For instance, alignment structures 41 on the top surface of the mounting substrate 2 may extend along, but slightly outside the edges or sidewalls of the upper substrate 22.

Alternatively, the surfaces of both substrates facing each other may be provided with local alignment structures such as domes, pillars, studs or other kinds of local elevations or protrusions (not illustrated) which engage in one another as both substrates 2, 22 approach one another for being mounted together. For instance, at each corner region of the smaller, upper substrate 22, three protruding alignment structures such as domes, pins or studs etc. may engage or embrace one respective single corresponding structure on the surface of the lower substrate 2, or vice versa. Whatever particular design and arrangement of alignment structures between the substrates 2, 22 may be chosen, anyway final mounting may include provision of a glue layer or of local areas of glue or of other kinds of adhesive. The substrates 2, 22 or one of them may be a printed circuit board (PCB). The at least one first fiber coupling element 4 may already been mounted or may subsequently be mounted on the further substrate surface 2b of the further substrate 22. Compared to the at least one first fiber coupling element 4 as well as compared to the optional third alignment structures 41 for connecting two substrates 2, 22 which both may be quite large due to the dimensions and robustness of the mounting substrates 2, 22, the at least one second fiber coupling element 5 is much smaller and is mounted directly on the main surface 100, around the active area surface 11 relative to which it is aligned, such as self-aligned. Since the optical fiber 30 is flexible and elastic, the fiber end-piece 31 will automatically adopt the optimum position as predefined by the second fiber coupling element 5 on top of the main surface 100 of the substrate 10.

Figure 13:
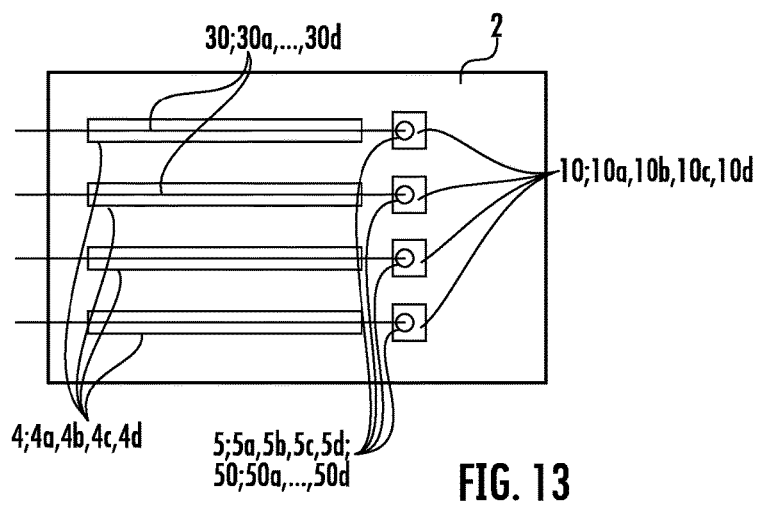
FIG. 13 shows a fiber coupling device comprising a plurality of electronic and/or photonic elements.

Whereas so far only one single chip has been regarded and depicted on the mounting substrate 2 of the fiber coupling device 1, it is to be noted that, instead, any embodiment may be altered, as indicated in FIG. 13 schematically, such that a plurality of optoelectronic and/or photonic chips 10; 10a, 10b, 10c, 10d, each comprising one respective active element 50 (or, alternatively, a plurality of them) may be provided on the mounting substrate 2. For instance, the fiber coupling device 1 may comprise a mounting substrate 2 on which four chips 10; 10a, 10b, 10c, 10d and thus four active elements 50; 50a, 50b, 50c, 50d are mounted. Accordingly, the fiber coupling device 1 may be designed for being coupled to four fiber end-pieces 31 of four optical fibers 30. Alternatively, it may be designed for any other number of fibers 30 to be connected to it.

Thus a corresponding plurality of (for instance four) optical fibers is couplable to the plurality of active elements by means of a plurality of second fiber coupling elements 5; 5a, . . . , 5d. The first fiber coupling elements 4; 4a, . . . , 4d, such as grooves 3, for instance, then provide for coarse alignment of the fibers 30, whereas the second fiber coupling elements 5; 5a, . . . , 5d self-aligned to the active area surfaces 11 provide for fine alignment, that is for high-precision alignment of the fiber end-pieces 31 to the active area surfaces 11. Thereby, proper alignment with high coupling efficiency is obtained even though the first fiber coupling elements 4; 4a, . . . , 4d do not suffice for achieving high-precision alignment.

The fiber coupling device 1 of the present application is couplable to optical fibers 30 having a fiber core 35 which, either along the actual length of the elongate fiber section 35 or at the uncoated, tapered, bulged and/or cleaved fiber end-piece 31, has a cross-section that may be significantly larger than the lateral extension or cross-section of the at least one active element 50 on the main surface 100 of the at least one chip 10.

The invention claimed is:

1. A fiber coupling device comprising:
   a mounting substrate,
   at least one chip, said chip being selected from optoelectronic and photonic chips, or a combination thereof, having a main surface and comprising at least one optoelectronic, photonic active element, or a combination thereof, arranged on the main surface, the or each active element being couplable to a fiber end-piece of a respective optical fiber in a vertical direction with respect to the main surface, wherein the at least one chip is mounted to a surface of the mounting substrate such that the main surface is normal to the surface of the mounting substrate to which the at least one chip is mounted, and
   at least one first fiber coupling element for coupling an optical fiber to the fiber coupling device,
   wherein the fiber coupling device further comprises at least one second fiber coupling element which is associated with a fiber end-piece of at least one optical fiber and which is mounted to the main surface of the at least one chip in a position aligned relative to the active element.

2. The fiber coupling device of claim 1, wherein each second fiber coupling element is designed to ensure automatic alignment of a fiber end-piece of a respective optical fiber relative to a respective active element by mechanical contact and/or engagement of the fiber end-piece with the second fiber coupling element.

3. The fiber coupling device of claim 1, wherein the at least one second fiber coupling element is mounted to the main surface of the at least one optoelectronic and/or photonic chip in a position which is aligned, at least along one or two lateral directions parallel to the respective main surface, relative to the respective active element, wherein the at least one second fiber coupling element leaves the respective optoelectronic and/or photonic active element exposed on the main surface.

4. The fiber coupling device of claim 1, wherein the first fiber coupling element is designed so as to effect a temporary and/or local pre-alignment of an optical fiber or of a fiber end-piece thereof during mounting to the fiber coupling device, wherein the second fiber coupling element is positioned so as to ensure a final alignment of the optical fiber or of a fiber end-piece thereof upon contact and/or engagement with the second fiber coupling element parallel to the main surface.

5. The fiber coupling device of claim 1, wherein each second fiber coupling element comprises an elevated structure protruding above the main surface of the at least one optoelectronic and/or photonic chip so as to adjust a position of a fiber end-piece at least along one or two lateral directions.

6. The fiber coupling device of claim 1, wherein the second fiber coupling element is a fiber coupling element separate from the first fiber coupling element and wherein the fiber coupling device is designed such that a distance between the first fiber coupling element and the second fiber coupling element is to be bridged by an optical fiber and/or by a fiber end-piece thereof.

7. The fiber coupling device of claim 1, wherein the fiber coupling device is designed such that the at least one second fiber coupling element is positioned entirely outside a propagation path reserved for propagation of a beam of electromagnetic radiation between a fiber end-piece and the at least one active element.

8. The fiber coupling device of claim 7, wherein the at least one second fiber coupling element comprises an elevated structure laterally surrounding a respective active element on the main surface, and wherein the elevated structure comprises one of an annular or ring-shaped, quadratic or rectangular ridge or stud surrounding a through-hole through which the active element is exposed.

9. The fiber coupling device of claim 1, wherein the second fiber coupling element is further positioned and/or shaped to keep a fiber end-piece of an optical fiber at a predetermined distance from the active element of the optoelectronic and/or photonic chip.

10. The fiber coupling device of claim 1, wherein the at least one second fiber coupling element comprises a plurality of columns, protrusions or of otherwise designed, elevated structures which are separate from one another and which are arranged on the main surface around the respective active element.

11. The fiber coupling device of claim 1, wherein the second fiber coupling element is intransparent for the wavelength or range of wavelengths to be coupled to the active element.

12. The fiber coupling device of claim 1, wherein the at least one second fiber coupling element is an integrated substrate-level microstructure integrated on the main surface of the at least one optoelectronic and/or photonic chip.

13. The fiber coupling device of claim 1, wherein the at least one first fiber coupling element comprises at least one clearance hole through which a respective optical fiber is insertable, wherein a diameter or cross-section of the clearance hole is designed wider than a standard diameter of optical fibers so as to provide lateral leeway or margin between an optical fiber and a perimeter of the clearance hole during insertion of an optical fiber through the clearance hole.

14. The fiber coupling device of claim 1, wherein the fiber coupling device is designed for coupling to an optical fiber having a fiber core which, along an elongate fiber portion of uniform cross-section beyond a fiber end-piece, has a diameter being at least 50% larger than the lateral diameter of the at least one active element of the fiber coupling device.

15. The fiber coupling device of claim 1, wherein the at least one optoelectronic and/or photonic chip is mounted on the mounting substrate, wherein the fiber coupling device further comprises a further substrate, wherein the at least one first fiber coupling element is mounted to the further substrate and the further substrate is mounted to the mounting substrate at a distance from the at least one optoelectronic and/or photonic chip.

16. A fiber coupling device comprising:
a mounting substrate,
at least one chip comprising at least one optoelectronic active element arranged on a main surface of the chip, each optoelectronic active element being couplable to a fiber end-piece of a respective optical fiber, and
at least one first fiber coupling element for coupling an optical fiber, and
at least one second fiber coupling element shaped so as to engage with or at least contact a fiber end-piece of a respective optical fiber,
wherein the at least one second fiber coupling element is supported by the main surface of the at least one chip and surrounds the respective active element.

17. The fiber coupling device of claim 16, wherein each second fiber coupling element is shaped to mechanically contact and/or engage with a fiber end-piece.

18. The fiber coupling device of claim 16, wherein the at least one second fiber coupling element extends on the main surface of the at least one chip so as to laterally surround the respective active element, thereby leaving the respective active element exposed in the center of the second fiber coupling element.

19. The fiber coupling device of claim 16, wherein each second fiber coupling element comprises one or a plurality of ridges, pillars, columns and/or studs.

20. The fiber coupling device of claim 16, wherein each second fiber coupling element is integrally connected to the main surface of the respective chip, wherein the first fiber coupling element is mounted to the mounting substrate or to a pedestal, further substrate or further support structure mounted to the mounting substrate.

21. The fiber coupling device of claim 16, wherein each second fiber coupling element is shaped so as to engage with, abut and/or support a fiber end-piece that is tapered and/or bulged.

22. A fiber coupling device comprising:
a mounting substrate,
a plurality of optoelectronic and/or photonic chips each comprising a main surface and one opto-electronic and/or photonic active element arranged on the respective main surface, the active elements being couplable to optical fiber end-pieces, and one or plural first fiber coupling elements for supporting an optical fiber close to their fiber end-pieces, plural second fiber coupling elements each being shaped for engaging with a respective fiber end-piece of one respective fiber end-piece, and wherein the plural second fiber coupling elements are each shaped and/or arranged, on the main surfaces of the optoelectronic and/or photonic chips, to surround the respective active element.

23. A fiber coupling device comprising:

a mounting substrate, at least one optoelectronic and/or photonic chip having a main surface and comprising at least one opto-electronic and/or photonic active element arranged on the main surface, each optoelectronic and/or photonic active element being couplable to a fiber end-piece of a respective optical fiber, and at least one first fiber coupling element for coupling an optical fiber to the fiber coupling device, wherein the fiber coupling device further comprises at least one second fiber coupling element which is designed to contact and/or engage with a fiber end-piece of at least one optical fiber and which is grown on the main surface of the at least one optoelectronic and/or photonic chip in a position aligned relative to the active element.

24. A fiber coupling device comprising:

a mounting substrate, at least one optoelectronic and/or photonic chip, each optoelectronic and/or photonic chip comprising a main surface with an optoelectronic and/or photonic active element, and at least one first fiber coupling element for supporting an optical fiber to be coupled to the optoelectronic and/or photonic active element of the respective chip, and at least one second fiber coupling element, wherein the at least one first fiber coupling element is designed to support, contact and/or engage with a circumferential surface of an optical fiber at a distance from the respective optoelectronic and/or photonic chip, wherein the at least one second fiber coupling element is connected to the main surface of the at least one optoelectronic and/or photonic chip close to and/or around such that the second fiber coupling element surrounds the respective active element and is designed to support, contact and/or engage with a fiber end-piece that is tapered and/or bulged.

* * * * *

UNITED STATES PATENT AND TRADEMARK OFFICE
CERTIFICATE OF CORRECTION

PATENT NO. : 10,126,511 B2
APPLICATION NO. : 15/157691
DATED : November 13, 2018
INVENTOR(S) : Soren Boldicke et al.

Page 1 of 1

It is certified that error appears in the above-identified patent and that said Letters Patent is hereby corrected as shown below:

In the Claims

In Column 16, Line 50, Claim 1, delete "the or" and insert -- or the --, therefor.

Signed and Sealed this
Twenty-second Day of December, 2020

Andrei Iancu
*Director of the United States Patent and Trademark Office*